(12) United States Patent
Shapiro et al.

(10) Patent No.: US 6,870,888 B1
(45) Date of Patent: Mar. 22, 2005

(54) BIT ALLOCATION AMONG CARRIERS IN MULTICARRIER COMMUNICATIONS

(75) Inventors: Jerome M. Shapiro, Belmont, MA (US); Stuart D. Sandberg, Arlington, MA (US); Marcos C. Tzannes, Orinda, CA (US)

(73) Assignee: Aware, Inc., Bedford, MA (US)

( * ) Notice: Subject to any disclaimer, the term of this patent is extended or adjusted under 35 U.S.C. 154(b) by 0 days.

(21) Appl. No.: 09/600,971

(22) PCT Filed: Nov. 23, 1999

(86) PCT No.: PCT/US99/27798
§ 371 (c)(1),
(2), (4) Date: Jul. 20, 2000

(87) PCT Pub. No.: WO00/31940
PCT Pub. Date: Jun. 2, 2000

Related U.S. Application Data
(60) Provisional application No. 60/109,876, filed on Nov. 25, 1998.

(51) Int. Cl.[7] .............................................. H04L 27/28
(52) U.S. Cl. ........................ 375/260; 375/219; 375/220; 375/225; 375/227; 370/242; 370/252
(58) Field of Search ................................ 375/260, 220, 375/219, 225, 227; 370/242, 252, 470, 471

(56) References Cited

U.S. PATENT DOCUMENTS

| | | | |
|---|---|---|---|
| 4,731,816 A | 3/1988 | Hughes-Hartogs | 379/98 |
| 5,596,604 A | 1/1997 | Cioffi et al. | 345/260 |
| 5,822,372 A | 10/1998 | Emami | 375/260 |
| 6,408,033 B1 * | 6/2002 | Chow et al. | 375/260 |
| 6,449,288 B1 * | 9/2002 | Chari et al. | 370/470 |
| 6,452,907 B1 * | 9/2002 | Levin | 370/252 |
| 6,480,475 B1 * | 11/2002 | Modlin et al. | 370/294 |
| 6,549,520 B1 * | 4/2003 | Gross et al. | 370/242 |

FOREIGN PATENT DOCUMENTS

| | | |
|---|---|---|
| EP | 0 703 685 A2 | 3/1996 |
| EP | 0 812 087 A2 | 12/1997 |

* cited by examiner

Primary Examiner—Shuwang Liu
(74) Attorney, Agent, or Firm—Miles & Stockbridge P.; Jason H. Vick

(57) ABSTRACT

A technique is provided that may be employed in multicarrier communications to improve the efficiency of error correction using symbol-oriented error correction methodologies, by reducing the number of error correction code symbols (102, 104 . . . ) that are received in error that result from a single channel error. More specifically, in this technique, bits from the symbols are allocated among the channels in such a way as to minimize the number of respective channels that are allocated bits belonging to more that one respective symbol during a respective transmission period.

3 Claims, 5 Drawing Sheets

| 70 | 72 | 74 | 76 |
|---|---|---|---|
| 1 | 2 | 8 | G2 |
| 2 | 9 | 8 | G9 |
| 3 | 3 | 7 | G3 |
| 4 | 7 | 1 | G7 |
| 5 | 6 | 6 | G6 |
| 6 | 5 | 2 | G5 |
| 7 | 10 | 6 | G10 |
| 8 | 11 | 2 | G11 |
| 9 | 1 | 5 | G1 |
| 10 | 4 | 3 | G4 |
| 11 | 8 | 4 | G8 |
| 12 | 12 | 4 | G12 |
| ⋮ | ⋮ | ⋮ | ⋮ |

— 62

| C | B | G |
|---|---|---|
| 1 | 5 | G1 |
| 2 | 8 | G2 |
| 3 | 7 | . |
| 4 | 3 | . |
| 5 | 2 | . |
| 6 | 6 | . |
| 7 | 1 | . |
| 8 | 4 | . |
| 9 | 8 | . |
| 10 | 6 | . |
| 11 | 2 | G11 |
| 12 | 4 | G12 |

FIG. 2

| 70 | 72 | 74 | 76 |
|---|---|---|---|
| 1 | 2 | 8 | G2 |
| 2 | 9 | 8 | G9 |
| 3 | 3 | 7 | G3 |
| 4 | 7 | 1 | G7 |
| 5 | 6 | 6 | G6 |
| 6 | 5 | 2 | G5 |
| 7 | 10 | 6 | G10 |
| 8 | 11 | 2 | G11 |
| 9 | 1 | 5 | G1 |
| 10 | 4 | 3 | G4 |
| 11 | 8 | 4 | G8 |
| 12 | 12 | 4 | G12 |

FIG. 3

BIT ALLOCATION AMONG CARRIERS IN MULTICARRIER COMMUNICATIONS

CROSS REFERENCE TO RELATED APPLICATION

The subject application claims the priority of copending U.S. provisional patent application Ser. No. 60/109,876, filed Nov. 25, 1998, entitled "Method For Allocating Bits Among Carriers In A Multicarrier Communications System." The entirety of the disclosure of said provisional application is incorporated herein by reference.

BACKGROUND OF THE INVENTION

1. Field of the Invention

The invention relates to communication systems and, more particularly, to the transmission of information using multicarrier transmission techniques wherein symbol-oriented error correction is employed.

2. Brief Description of Related Prior Art

The public switched telephone network (PSTN) provides the most widely available form of electronic communication for most individuals and businesses. Because of its ready availability and the substantial cost of providing alternative facilities, it is increasingly being called upon to accommodate the expanding demands for transmission of substantial amounts of data at high rates. Structured originally to provide voice communication with its consequent narrow bandwidth requirements, the PSTN increasingly relies on digital systems to meet the service demand.

A major limiting factor in the ability to implement high rate digital transmission has been the subscriber loop between the telephone central office (CO) and the premises of the subscriber. This loop most commonly comprises a single pair of twisted wires which are well suited to carrying low-frequency voice communications for which a bandwidth of 0–4 kHz is quite adequate, but which do not readily accommodate broadband communications (i.e., bandwidths on the order of hundreds of kilohertz or more) without adopting new techniques for communication.

One approach to this problem has been the development of discrete multitone digital subscriber line (DMT DSL) technology. In this approach to communications over the local subscriber loop between the central office and the subscriber premises, data to be transmitted is modulated onto a multiplicity of discrete frequency carriers which are summed together and then transmitted over the subscriber loop. Individually, the carriers effectively form subchannels that are separated from each other in frequency by a relatively small amount, but which collectively form what is effectively a broad bandwidth communications channel. At the receiver end, the carriers are demodulated and the data recovered.

Communication using such technology is by way of "frames" of data and control information. In a presently-used form of asymmetric digital subscriber line ("ADSL") communications, sixty eight data frames and one synchronization frame form a "superframe" that is repeated throughout the transmission. The data frames carry the data that is to be transmitted; the synchronization or "sync" frame provides a known bit sequence that is used to synchronize the transmitting and receiving modems and that also facilitates determination of transmission subchannel characteristics such as signal-to-noise ratio ("SNR"), among others.

A superframe is 17 milliseconds in duration. A frame is effectively 250 microseconds in duration (or conversely, the frame rate is approximately 4 kHz) and is made up of a collection of bytes.

The bits comprised in each frame and superframe are transmitted over the subchannels. The number of bits carried on each subchannel (i.e., the "bit loading") during each data symbol or data block transmission period is determined by transmitting a reference signal over the subchannels and measuring the characteristics of the subchannel, typically, the signal to noise ratio, based on this. The bit loading may vary from one subchannel to another, depending on the signal-to-noise ratio of the particular channels. The loading information is typically calculated at the receiving end of the subscriber line (e.g., at the subscriber premises in the case of transmission from the central office to the subscriber) and is communicated to the other end. It is stored at both ends in the form of at least one "bit-loading table" that thereby defines the communications over the channel.

The maximum amount of information that can be encoded onto a particular subcarrier is a function of the signal to noise ratio of the communication channel with respect to that subcarrier. The signal to noise ratio of a communication channel can vary according to frequency so that the maximum amount of information that can be encoded onto one carrier may be different from the maximum amount of information that can be encoded onto another carrier.

A bit loading algorithm provides at least one bit allocation table that indicates the amount of information (in bits) that is to be encoded on each of the carriers. That is, for a multicarrier communication system with J carriers, a bit allocation table B[j] indicates, for each j=1 to J, the amount of information that is to be encoded onto each of the J carriers.

Shaping the transmission to match the channel characteristics is known. For example, a technique known as "water pouring" was introduced by Gallager in 1968 ("Information Theory and Reliable Communication", page 389) and by Wozencraft in 1965 ("Principles of Communication Engineering", pp. 285–357). Water pouring involves distributing the energy of the transmission signal according to the channel frequency response curve (a plot of the signal to noise ratio as a function of frequency). The frequency response curve is inverted and the available signal energy (the "water") is "poured" into the inverted curve so that more of the energy is distributed into those portions of the channel having the highest signal to noise ratio. In a multicarrier system in which the transmission band is divided into numerous subchannels, throughput can be maximized by putting as many bits in each subcarrier as can be supported given the "water pouring" energy and a desired error rate.

Other techniques for allocating bits among carriers of a multicarrier signal are known. For example, U.S. Pat. No. 4,731,816 to Hughes-Hartogs discloses a bit loading scheme where one bit at a time is incrementally added to each subcarrier until a maximum rate is achieved. Subcarriers that require the least amount of additional power to support an additional bit are selected first.

Another example is disclosed in U.S. Pat. No. 5,479,477 to Chow et al. More specifically, Chow et al. discloses a bit loading scheme that is capable of either maximizing the throughput or maximizing the margin for a particular target data rate. Unlike Hughes-Hartogs, Chow et al. determines the bit loading table one carrier at a time (rather than one bit at a time). In Chow et al., all the carriers are sorted in descending order according to the measured signal to noise ratio. The initial subchannels that are selected are the ones capable of carrying the most bits. Using the Chow et al. scheme to maximize the data rate provides a bit loading table similar to that provided by the Hughes-Hartogs algorithm.

Another conventional technique is disclosed in U.S. Pat. No. 5,596,604 to Cioffi et al. In pertinent part, Cioffi et al. discloses that in order to address problems of noise-related errors in the communications system, forward error correction coding (FECC) and interleaving techniques may be implemented. Accordingly to these techniques, an input data block to be transmitted is augmented with parity data so as to constitute a codeword and so as to enable errors in the block to be detected and corrected. Codewords may be interleaved for transmission to reduce the effect of error bursts on individual code words.

Cioffi et al. teaches that there may exist a trade-off between high reliability, which requires effective error correction and immunity to noise, and short transmission delays. That is, Cioffi et al. teaches that by increasing the periods over which interleaving is effected, the system may be made to exhibit greater immunity to impulse noise, but this may come at the cost of greater transmission delays. In order to try to improve this trade-off situation, Cioffi et al. proposes applying FECC coding and codeword interleaving differently to input signals from different channels to produce encoded data signals having different reliabilities and different coding delays. Bits of encoded data signals having relatively less delay are allocated to carriers that are subject to relatively more attenuation and/or channel noise. This is said to permit each signal to be transmitted in accordance with an individually selected compromise between high reliability and short transmission delay.

Thus, in multicarrier communications, it is known to utilize FECC coding techniques (e.g. Reed Solomon coding) that are symbol based, whereby to enable the receiver to detect and correct errors in the received FECC symbols. However, depending upon the type of error correction coding methodology employed and the manner in which bit loading is performed, certain problems may arise in multicarrier communications. For example, according to the prior art, bit loading is carried out such that bits are loaded into the channels or subchannels (collectively or singly referred to hereafter as "channels") from a serial input bit stream, in ascending channel order or increasing constellation size, without regard to whether the bits assigned to any given channel during a given transmission period are comprised in more than one FECC symbol. As can be readily appreciated, given these types of bit loading schemes, it is common for bits from multiple FECC symbols to be assigned to a single channel in a given transmission period. As mentioned above, FECC codes map the serial input bit stream to codewords that are a collection of FECC symbols, where an FECC symbol is composed of a finite number of bits (e.g. one byte). The codeword also contains FECC parity symbols, which are overhead symbols that are added to the bit stream to provide the error correction capability at the receiver. The FECC codewords are constructed in such a way so as to enable the receiver to correct a certain number of FECC symbols that are received in error. The number of symbols that can be corrected by a given FECC code is known as the "correction capability" of the code.

When such symbol-oriented coding and bit loading are employed, an error on a single channel may cause errors to be introduced into multiple FECC symbols; unfortunately, this weakens the power of the FECC code since the code can only correct a fixed maximum number of FECC symbols received in error, and a single channel error that produces multiple symbol errors wastefully uses up the correction capability of the FECC code. It would be desirable to reduce the number of FECC symbols received in error that result from a single channel error, and to thereby increase the efficiency of error correction in multicarrier communications using such symbol-oriented error correction methodologies.

SUMMARY OF THE INVENTION

Accordingly, the present invention provides a technique that may be employed in multicarrier communications to improve the efficiency of error correction using symbol-oriented error correction methodologies, by reducing the number of symbol errors (e.g., FECC symbol errors) that result from individual channel errors. More specifically, in the technique of the present invention, bits from the symbols are allocated among the channels in such a way as to minimize the number of respective channels that are allocated bits belonging to more than one respective symbol during a respective transmission period. As will be appreciated by those skilled in the art, if the error correction code methodology being employed in the communications is symbol-oriented, then the likelihood of errors being correctable increases if single channel errors result in fewer symbols being received in error. Thus, since in the present invention, the number of channels that are assigned respective bits from more than one respective symbol during a respective transmission period is minimized, the likelihood that an error on a given channel during that transmission period will introduce errors into more than one symbol is reduced compared to the prior art. Thus, according to the present invention, it is more likely, compared to the prior art, that channel errors will be correctable. Advantageously, this permits multicarrier communications according to the present invention to exhibit improved error correction and data communication efficiency compared to the prior art.

In one embodiment of the present invention which is used to advantage in a multicarrier data modulation method, a plurality of carrier signals are provided for use in modulating data bit signals of a serial input data stream. The data bit signals are mapped to FECC symbols, with each symbol containing a finite number of bit signals. Each FECC symbol may have a respective size of one byte. Each carrier signal is associated with a respective transmission channel. The bit signals are allocated among the carrier signals for modulation using the carrier signals. The allocating of the bit signals among the carrier signals is carried out in such a way as to minimize the number of respective carrier signals that are allocated bit signals belonging to more than one respective symbol during a respective transmission period (e.g., a bit loading period). The bit signals are then modulated using the carrier signals.

In this embodiment, respective bit signals allocated to respective carrier signals may be comprised in a single respective symbol. The allocation of the bit signals among the carrier signals may comprise both determining respective maximum numbers of bit signals that may be transmitted via the respective channels without exceeding a desired maximum probability of bit transmission error and determining respective actual numbers of bit signals to be transmitted via the respective channels based upon the respective maximum numbers and such that the number of respective channels that are allocated bit signals belonging to more than one respective symbol is minimized or such that each respective channel only transmits respective bits belonging to a single respective symbol during the respective transmission period.

Alternatively, or in conjunction with the foregoing, the allocating of the bit signals among the carrier signals may comprise determining respective maximum numbers of bit signals that may be transmitted via the respective channels without exceeding a desired maximum probability of bit transmission error. The respective maximum numbers of bit signals may be allocated to the carrier signals in accordance with a carrier signal allocation sequence order. The sequence order may be such that the number of respective carrier signals that are allocated bit signals belonging to more than one respective symbol is minimized or such that each respective channel only transmits respective bits belonging to a single respective symbol during the respective transmission period.

Further alternatively, or in conjunction with the foregoing, the allocating of the bit signals among the carrier signals may comprise adjusting a transmission gain of at least one channel so as to change to a different number of bit signals a maximum number of bit signals that can be transmitted via the at least one channel without exceeding a desired maximum probability of bit transmission error, and allocating an actual number of bit signals to the carrier signal associated with the at least one channel in accordance with the different number.

These and other features and advantages of the present invention will become apparent as the following Detailed Description proceeds and upon reference to the Figures of the Drawings, wherein:

BRIEF DESCRIPTION OF THE DRAWINGS

FIG. 2 is a portion of a bit allocation table that may be stored in the memories of the transceivers of the system of FIG. 1.

Figure 3:
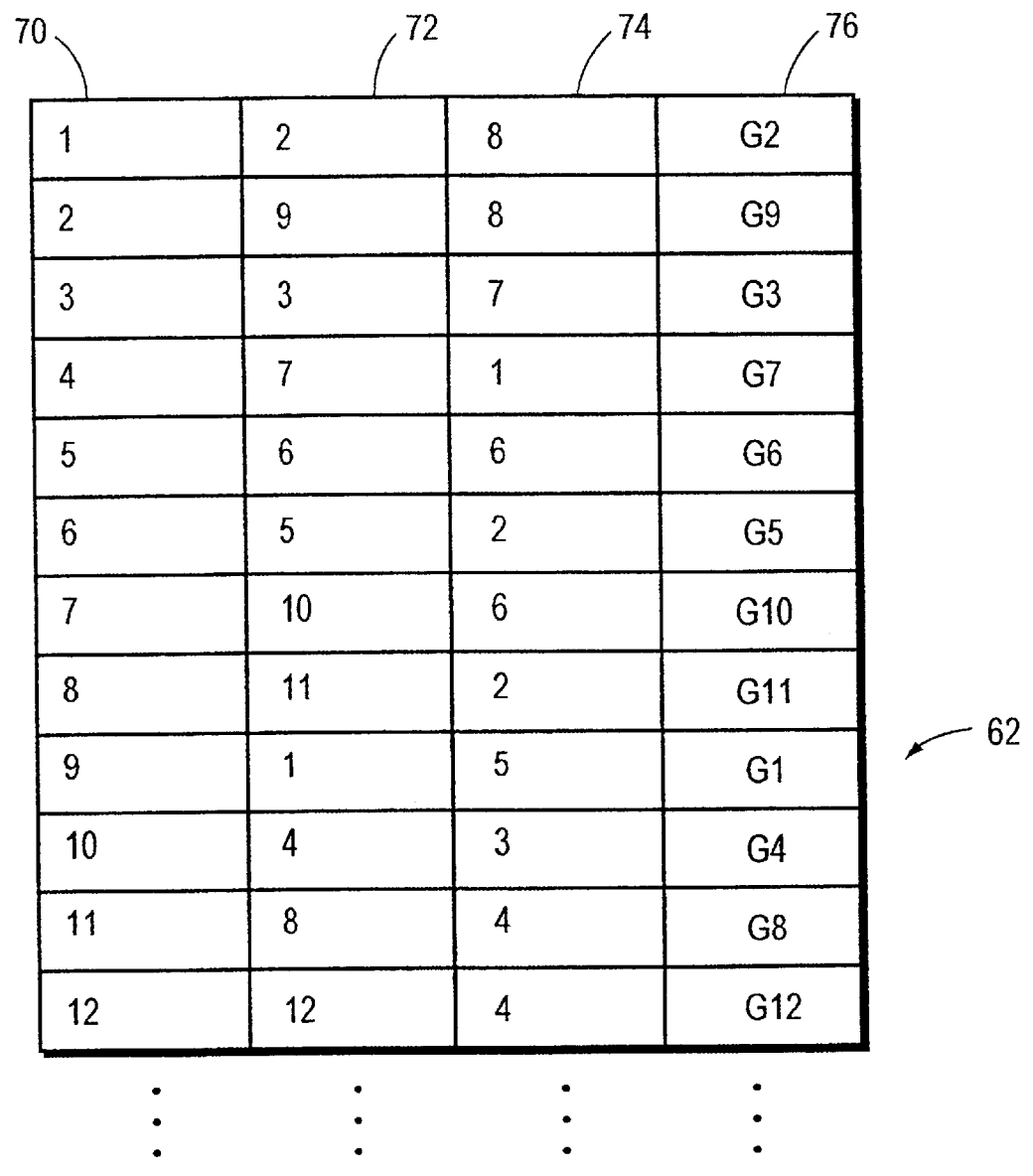

FIG. 3 is a portion of another bit allocation table that may be stored in the memories of the transceivers of the system of FIG. 1.

Although the following Detailed Description will proceed with reference being made to specific embodiments and methods of use, it is to be understood that the present invention is not intended to be limited to these embodiments and methods of use. Rather, as will be appreciated by those skilled in the art, many alternatives, modifications, and variations thereof are possible without departing from present invention. Accordingly, it is intended that the present invention be viewed broadly as encompassing all such alternatives, modifications, and variations as are within the spirit and broad scope of the hereinafter appended claims.

DETAILED DESCRIPTION OF ILLUSTRATIVE EMBODIMENTS

Figure 1:
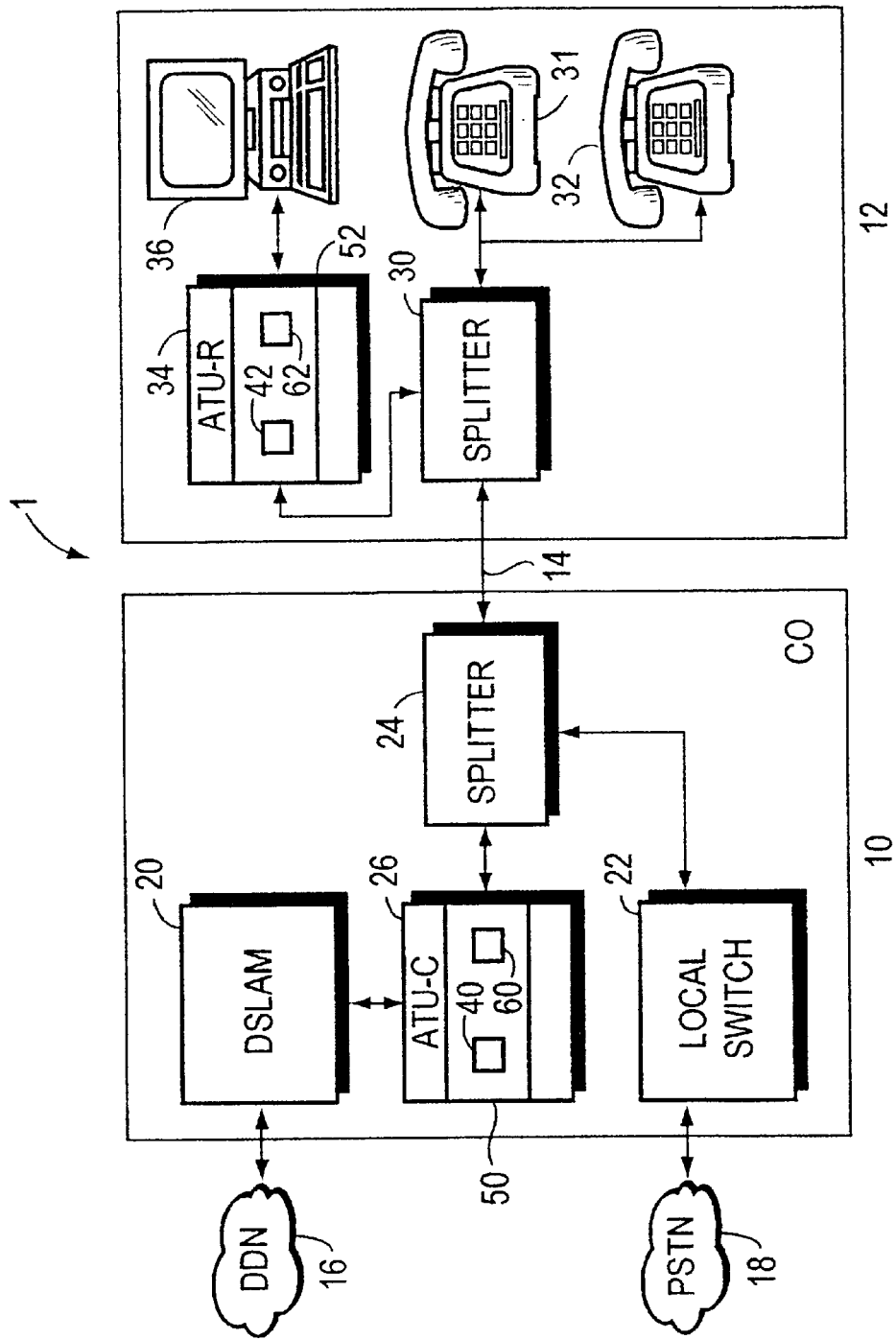
FIG. 1 is a schematic diagram of a DSL system wherein the present invention may be advantageously employed.

FIG. 1 shows a DSL communications system wherein the present invention may be advantageously used. As shown in FIG. 1, a telephone central office ("CO") 10 is connected to a remote subscriber 12 ("CP: Customer Premises") by a subscriber line or loop 14. Typically, the subscriber line 14 comprises a pair of twisted copper wires; this has been the traditional medium for carrying voice communications between a telephone subscriber or customer and the central office. Designed to carry voice communications in a bandwidth of approximately 4 kHz (kilohertz), its use has been greatly extended by DSL technology.

The central office is, in turn, connected to a digital data network ("DDN") 16 for sending and receiving digital data, as well as to a public switched telephone network ("PSTN") 18 for sending and receiving voice and other low frequency communications. The digital data network is connected to the central office through a digital subscriber line access multiplexer ("DSLAM") 20, while the switched telephone network is connected to the central office through a local switch bank 22. The DSLAM 20 (or its equivalent, such as a data enabled switch line card) connects to a POTS "splitter" 24 through an ADSL transceiver unit-central office ("ATU-C") 26. The local switch 20 also connects to the splitter.

The splitter 24 separates data and voice ("POTS") signals received from the line 14. At the subscriber end of line 14, a splitter 30 performs the same function. In particular the splitter 30 passes the POTS signals from line 14 to the appropriate devices such as telephone handsets 31, 32, and passes the digital data signals to an ADSL transceiver unit-subscriber ("ATU-R") 34 for application to data utilization devices such as a personal computer ("PC") 36 and the like. The transceiver 34 may advantageously be incorporated as a card in the PC itself; similarly, the transceiver 26 is commonly implemented as a line card in the multiplexer 20.

In this approach, the total communications bandwidth is divided into a multiplicity of channels, each a fraction of the total bandwidth. Each channel is associated with a respective carrier signal, and data to be transmitted from one transceiver via a respective channel to the other transceiver is modulated onto the respective channel using the respective carrier associated with the respective channel. Because of differing signal-to-noise ("SNR") characteristics of the channels, the maximum amount of data that can be effectively loaded differs among the channels. Accordingly, a respective "bit allocation table" 40, 42 is maintained at each transceiver to define the respective maximum numbers of bits that each may transmit on each respective channel, during each data transmission time period, to the transceiver to which it is connected.

The bit allocation tables 40, 42 are created during an initialization process which includes transmission of test signals in each of the channels by each transceiver to the other transceiver and measuring of signal to noise ratios (SNR) in each of the channels. The signals received at the respective transceivers are measured in order to determine the maximum numbers of bits that can be transmitted from one transceiver to the other in the respective channels via the particular line, given measured SNR of transmissions in the channels, without exceeding a predetermined bit transmission error rate probability (e.g., one bit error per every $10^7$ bits transmitted). The bit allocation table (e.g., 40) determined by a particular transceiver (e.g., 26) is then transmitted over the digital subscriber line 14 to the other transceiver (e.g., 34) for use by the other transceiver (e.g., 34) in accordance with this embodiment of the present invention.

It should be understood that each of the transceivers or modems 26, 34 comprises a respective processor 33, read only and random access memories (collectively referred to by numerals 50, 52, respectively), and transmitter and receiver circuitry blocks (not shown) which are interconnected via conventional bus circuitry (not shown), and are operable to permit the transceivers 26, 34 to carry out the DSL communications processes and the various other processes according to the present invention described herein. The read only random access memories 50, 52 of these modems 26, 34 store program code instructions which are executable by the modems' processors, and when executed by the processors, cause the modems to carry out these processes. The memories 50, 52 also store the bit allocation tables 40, 42, respectively.

Figure 2:
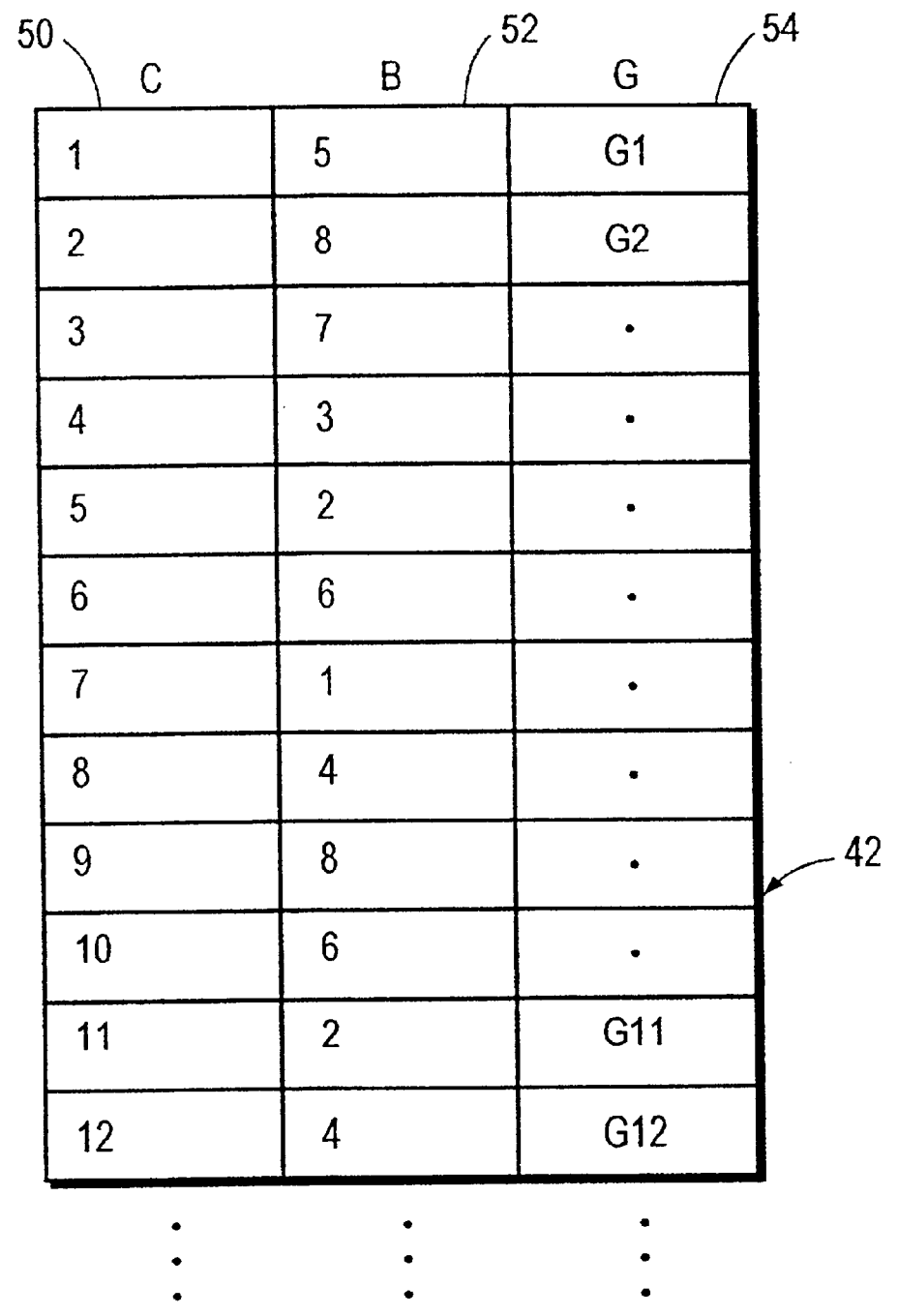

Referring now to FIG. 2, one example of a construction of the bit allocation table 42 that is used in the customer premises equipment is shown in further detail. Table 40, used at the central office, is essentially the same in construction and operation as table 42, and therefore, will not further be described. In column 50, table 42 lists the available communications channels in system 1 by channel number. In a full-rate ADSL system, there are up to two hundred and fifty-six such subchannels, each of bandwidth 4.1 kHz. For example, in one embodiment of the invention, upstream communications (i.e., from the customer premises to the central telephone office) are conducted on a first set of the channels while downstream communications (from the central office to the customer premises) are conducted on a second, different set of channels, and a plurality of channels form a guard band between the upstream and downstream communications that may be used for signaling between the modems 26, 34. For purposes of simplicity of illustration, however, only twelve channels are shown in the table portion 42 of FIG. 2.

As an alternative to this arrangement, the same channels may be used for transmission and reception by both transceivers, e.g. the upstream and downstream communications may both utilize channels 1–32 to transmit data. In this alternative there are more columns in table 42 for each communication direction.

For each channel ("C") in row 50, a field 52 defines the maximum number of bits ("B") that may be transmitted over that channel by the transmitter of a communications or modem pair, and received by the receiver of that pair, consistent with the prevailing conditions on the channel, e.g., measured signal-to-noise ratio (SNR), desired probability of error rate, and the corresponding gains G1, G2, etc. of column 54 assigned to the channels, etc. The table 42 specifies the respective maximum bit allocations using the transmission gains for each of the channels that transceiver 34 may use in transmitting "upstream" to the transceiver 26, also specifies the maximum bit allocations using the transmission gains for each of the channels that transceiver 34 may use in receiving transmissions from the transceiver 26. Transceiver 26 has a corresponding table 40 which is the mirror image of table 42, that is, the maximum bit allocations and gains specified for transmission by transceiver 34 are the same as those specified for reception by transceiver 26 and correspondingly for reception by transceiver 34 and transmission by transceiver 26.

In this embodiment of the invention, actual bit loading is performed using table 62 which comprises columns 70, 72, 74, and 76. The corresponding rows of columns 70 and 72 specify a sequence order (listed in column 70) in which the communication channels of system 1 (listed in column 72) are to be loaded with bits from the serial input data bit streams 100, 200 to be transmitted across link 14, and corresponding rows of column 74 and 76 specify the respective numbers of bits (listed in column 74) to be loaded into each of the channels listed in column 72 and the respective transmission gains (listed in column 76) that are to be used in transmitting the respective data bits via the respective channels. That is, during communications between the transceivers 26, 34, each of the transceivers 26, 34 transmits to the other transceiver bits comprised in a respective serial input data stream 100, 200, respectively. Data stream 100 is provided to modem 26 by DDN 16 via DSLAM 20; data stream 200 is provided to modem 34 from computer 36. Each of these serial data streams 100, 200 comprises a multiplicity of serial data bit signals mapped into respective FECC symbols 102, 104, 106, 108, 110, 112, etc. in the case of stream 100, and 202, 204, 206, 208, 210, 212, etc. in the case of stream 200; each of the FECC symbols is of the same size (e.g., one byte). During each data transmission time period, respective bits of serial bit streams 100, 200 are allocated and loaded into the respective channels in the sequence order and with the respective bit numbers specified in table 62.

For example, assuming that at least channels 1–12 are assigned to data communications from transceiver 26 to transceiver 34, during the first data transmission period, as specified in the first row of table 62, channel 2 is allocated the first 8 bits of the stream 100, and channel 9 is allocated the following 8 bits of the stream 100. Thereafter, channel 3 is allocated the next 7 bits of stream 100, and so forth. Bit signals from stream 200 are assigned to respective channels (not shown) for transmission of data from the transceiver 34 to the transceiver 26 in a similar fashion (i.e., in accordance with the sequence order specified in column 70, the respective numbers of bits specified in column 74). Each of the transceivers transmits via the respective channels assigned to it for data transmission, the respective data bit signals, as allocated in the tables 60, 62, by modulating the respective data bit signals with the respective carrier signal associated with the respective channel, and at the respective gain specified in column 76 for the respective channel.

As noted previously, transceiver 26 has table 60 which is the mirror image of table 62. That is, the actual bit allocations, channel bit loading sequence order (i.e., as specified in the rows of columns 70 and 72), and channel gains specified for transmission by transceiver 34 are the same as those specified for reception by transceiver 26 and correspondingly for reception by transceiver 34 and transmission by transceiver 26.

In table 62, the transmission gains assigned to the respective channels are identical to those specified for the respective channels in table 42. Also in table 62, the channels available for communication in system 1 are the same as those in table 42, and the respective numbers of bits allocated to the respective channels in table 62 are the same as the respective maximum numbers of bits allocated to the respective channels in table 42. A key difference between table 62 and 42 is columns 70 and 72 which together specify the order in which data bits are to be mapped to channels. The table 62 and its reordering columns (i.e., columns 70 and 72) are either communicated between transceivers during initialization or can be generated by each transceiver from table 42, if the transceivers use the same algorithm for generating the table 62 and reordering columns 70 and 72.

In accordance with this embodiment of the present invention, the channel bit loading sequence order specified in columns 70, 72 of table 62 is such that the number of respective channels (and also, therefore, carrier signals associated with the channels) that are allocated bit signals belonging to more than one respective symbol of the data streams 100, 200 is minimized. More particularly, in table 62, during a respective data transmission period, respective bit signals allocated to respective channels are comprised in only a single respective symbol.

Figure 4:
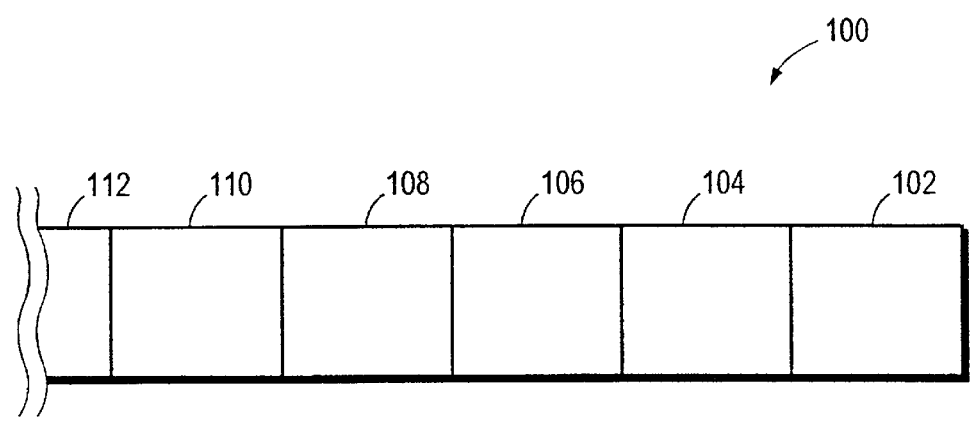
FIG. 4 is a symbolic representation of a serial input data bit stream whose bit signals are mapped into a plurality of FECC symbols, which representation is used to describe features of embodiments of the present invention.
Figure 5:
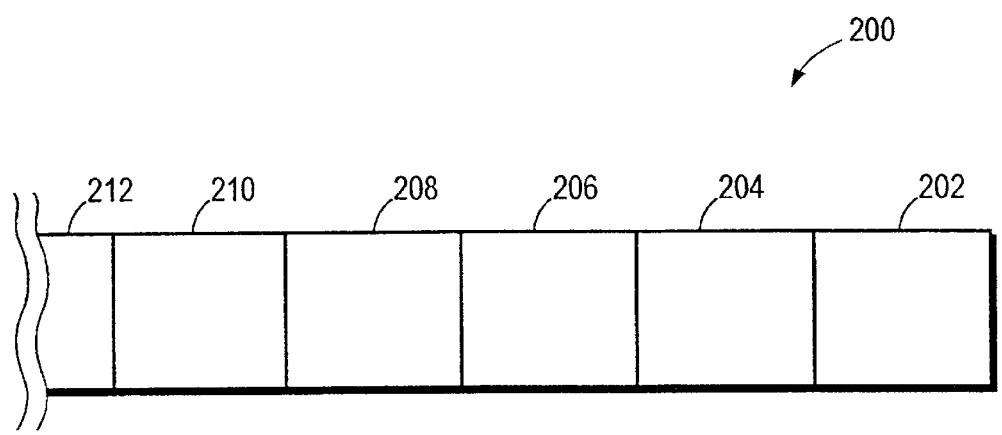
FIG. 5 is a symbolic representation of another serial input data bit stream whose bit signals are mapped into a plurality of FECC symbols, which representation is used to describe features of embodiments of the present invention.

For example, if one assumes for purposes of illustration that data bits of the stream 100 illustrated in FIG. 4 are being transmitted during the first transmission period following initialization of the table 62, and each symbol has a size of eight bits, then in accordance with actual bit loading scheme of table 62, channel 2 is allocated all of the bits of the first symbol 102 of stream 100. Channel 9 is allocated all of the bits of the second symbol 104 of stream 100. Channel 3 is allocated 7 bits of the third symbol 106 of stream 100, and the remaining bit of 106 of stream 100 is allocated to channel 7. Channel 6 is allocated 6 bits of the fourth symbol 108 of stream 100, and the remaining two bits of the 108 is allocated to channel 5, and so forth, so as to ensure that is in accordance with the bit loading specified in table 62, each of the channels is assigned bits from only a single respective symbol during a respective data transmission period.

Of course, as will be appreciated by those skilled in the art, depending upon the size of the symbols, and the maximum numbers of bits that can be transmitted via the respective channels at the respective channel gains specified in columns 52, 54 of table 42, a channel bit loading sequence order, using such maximum numbers of bits and gains, may not exist wherein each of the channels is assigned bits from only a single respective symbol during a respective data transmission period. Thus, it may be necessary to adjust one or more of the respective carrier or channel transmission gains G1, G2, etc., and/or SNR margins (i.e., the predetermined amount by which the actual SNR of a given channel exceeds a minimum SNR required for transmission of a number of bits allocated to channel with the desired bit error rate probability) so as to, in effect, change the maximum numbers of bits that are permitted to be transmitted via the respective channel or channels associated with the gains and/or SNR margins (consistent with the aforesaid types of prevailing conditions on the channel, desired transmission error rate probability, etc.) in a manner that permits each of the channels to be assigned bits from only a single respective symbol during a respective data transmission period. The amounts by which the channel transmission gains and/or SNR margins are adjusted to achieve this result may be determined empirically based upon the information derived and stored in the transceivers' memories as part of the "training" period at initialization of communications.

As an example, consider the case where in bit allocation table 42 carriers numbered 2 and 9 do not have 8 respective bits allocated to them, but instead have 7 and 9 allocated to them respectfully. In this case, it would not be possible to order the loading of the channels in such a way that each of the channels is assigned bits from only a single respective symbol during a respective data transmission period. This problem can be solved if different channel transmission gains (e.g., different from G2 and G9) are used to change the numbers of bits allocated to these channels corresponding to these gains. For example, in most cases an additional 3 dB of transmission gain will enable the transmission of one additional bit on a channel with the same desired bit error rate probability. Therefore, if G2 is increased to G2+3 dB, and G9 is decreased to G9−3 dB, then channels 2 and 9 may each carry 8 bits (as in the original table 42) without changing the bit error rate probability of these channels, thereby enabling the use of a channel bit loading sequence order wherein each of the channels is assigned bits from only a single respective symbol during a respective data transmission period.

Alternatively, fixed gain adjustments and/or SNR margin adjustments (e.g., of about 3.4 dB) may be applied to those channels that otherwise would be allocated bits from more than one respective symbol during a respective transmission period. Ideally, although not necessarily, the adjustments in channel transmission gains and/or SNR margins should be made in such a way as to ensure that the system 1 remains in compliance with applicable industry DSL channel transmission gain and power margin standards, which standards are well known to those skilled in the art. For example, such standards are disclosed in the ITU Standard G.992.2 and ANSI Standard T.413, which are incorporated herein by reference in their entireties.

Of course, it should be appreciated that the processor of the transceiver charged with determining the actual bit loading tables 60, 62 may use any combination of the aforesaid techniques to best achieve the minimization of the number channels allocated bits from more than one symbol. That is, during the "training" period at initialization of communications, that processor may exhaustively search through the various possibilities in terms of channel bit loading sequence orders, and/or channel transmission gain and/or SNR adjustments to arrive at an "optimal" result for communications based upon predetermined optimization criteria (e.g., such that the SNR margin adjustment is approximately equal across all channels and the number of channels being allocated bits from multiple symbols during a given transmission period is minimized).

While the present invention has been disclosed in connection with illustrative embodiments and methods of use, it is to be understood that many alternatives, modifications, and variations thereof are possible without departing from the present invention. For example, although the system 1 has been shown as comprising splitters 24, 30, if appropriately modified to accommodate and implement the teachings of copending PCT Application Serial No. PCT/US98/21442, entitled "Splitterless Multicarrier Modem," filed Oct. 9, 1998 (published as WO 99/20027), which is commonly owned by the owner of the subject application, Aware, Inc. of Bedford, Mass., U.S.A., splitters 24, 30 may instead be wholly eliminated from system 1. The entirety of the disclosure of said copending PCT application is incorporated herein by reference.

Other modifications are also possible. For example, rather than communicating both tables 42, 62 via line 14, only the second table 62 may be so communicated. Likewise, rather than generating two tables 42, 62, only a single table 62 need be generated by modem 34 during training. Accordingly, the present invention is intended to embrace all such alternatives, modifications, and variations as may be apparent to those skilled in the art and encompassed within the hereinafter appended claims.

What is claimed is:

1. In digital communications using multicarrier modulation, a method of reducing forward error correction coding (FECC) symbol errors comprising:
   providing a plurality of FECC symbols, each FECC symbol containing a number of bits;
   providing a plurality of subchannels for modulating the bits; and
   reordering the subchannels to reduce FECC symbol errors caused by bits from one subchannel being assigned to more than one FECC symbol.

2. In digital communications using multicarrier modulation, a system for reducing forward error correction coding (FECC) symbol errors comprising:
   means for providing a plurality of FECC symbols, each FECC symbol containing a number of bits;
   means for providing a plurality of subchannels for modulating the bits; and means for reordering the subchannels to reduce FECC symbol errors caused by bits from one subchannel being assigned to more than one FECC symbol.

3. In digital communications using multicarrier modulation, a forward error correction coding (FECC) symbol error reduction system comprising:

a plurality of FECC symbols, each FECC symbol containing a number of bits;

a plurality of subchannels for modulating the bits; and a transceiver configured to reordering the subchannels to reduce FECC symbol errors caused by bits from one subchannel being assigned to more than one FECC symbol.

* * * * *